United States Patent [19]

Mielke

[11] Patent Number: 5,156,291

[45] Date of Patent: Oct. 20, 1992

[54] HINGED COVER WITH AUXILIARY DOOR

[76] Inventor: Arthur Mielke, R.R. 3, Box 121, Chippewa Falls, Wis. 54729

[21] Appl. No.: 632,760

[22] Filed: Dec. 21, 1990

[51] Int. Cl.⁵ .................. B65D 51/18; A01K 97/04
[52] U.S. Cl. .................. 220/254; 220/264; 220/326; 220/334; 43/55
[58] Field of Search .......... 220/254, 336, 356, 361, 220/85 F, 601, 334, 263, 264, 326, 335; 43/55

[56] References Cited

U.S. PATENT DOCUMENTS

| | | | |
|---|---|---|---|
| 1,098,727 | 6/1914 | Hirsohn | 220/264 |
| 1,691,160 | 11/1928 | Meuttman | 220/254 |
| 1,964,513 | 6/1934 | Hammer | 220/334 X |
| 2,511,648 | 6/1950 | Milholland | 62/457.1 |
| 2,562,636 | 7/1951 | Odneal | 220/334 X |
| 3,524,278 | 8/1970 | Wolfe | 43/55 |
| 3,691,666 | 9/1972 | Herdwig | 220/334 X |
| 3,749,274 | 7/1973 | Mele et al. | 220/334 |
| 4,008,540 | 2/1977 | Broner | 43/55 |
| 4,260,070 | 4/1981 | Pierson | 220/335 |
| 4,456,141 | 6/1984 | Pamment | 220/1 T |
| 4,776,478 | 10/1988 | Miller et al. | 220/254 |
| 4,870,778 | 10/1989 | Sheppard | 43/55 |
| 5,038,515 | 8/1991 | Moorhead | 43/55 |

Primary Examiner—Stephen Marcus
Assistant Examiner—Vanessa Caretto
Attorney, Agent, or Firm—Russell L. Johnson

[57] ABSTRACT

The invention in its simplest form comprises a hinged cover for a fish receiving receptacle and the cover has a passage passing through the cover into which a frame containing a resiliently biased auxiliary door is secured. The bias urges the door against a stop which holds the door in the closed position so that the door may be opened in the inward direction by overcoming the biasing force. The stop is movable so that when the stop is disengaged from the door the bias will serve to hold the door in the open outward position.

4 Claims, 1 Drawing Sheet

HINGED COVER WITH AUXILIARY DOOR

FIELD OF THE INVENTION

This invention relates to hinged covers for receptacles for receiving fish.

More particularly this invention relates to an auxiliary door in combination with the cover described above.

Still more particularly, this invention relates to the combination of auxiliary door and cover described above wherein the auxiliary door is resiliently biased in the closed position.

Yet more particularly, this invention relates to the combination described above wherein the combination is to be used to enable sports fisherman to conveniently place fish inside a receptacle.

BACKGROUND OF THE INVENTION

There are many ways to hold fish between the time they are caught and the time they are cleaned and prepared for eating.

Studies have shown that the quality of the meat is best preserved when the fish are placed on ice immediately after catching and remain there until they are cleaned and prepared for eating or storage.

The availability of low cost insulated portable coolers has made it convenient to place the fish on ice in the cooler as they are caught, and to transfer the cooler with the fish in it from the boat or shore to a vehicle where the fish can be transported to the location of cleaning without being removed from the cooler.

A problem associated with this method of fish keeping is that when the fish is caught the fisherman often has a fishing rod in one hand, and a fresh caught fish in the other hand. The fisherman at that time does not have a hand free to open the hinged top of the cooler to place the fish inside.

OBJECTS

It is therefore an object of this invention to provide a hinged cover for a fish receiving receptacle, said cover being provided with an auxiliary door in the cover wherein the door is hinged so as to be openable inward of the cooler and the door is resiliently biased in the closed direction.

It is further an object of this invention to provide the cover and auxiliary door combination described above wherein the auxiliary door is provided with a movable door stop such that when the stop is disengaged from the door, the resilient biasing of the door will cause the door to be maintained in the open outward position.

It is further an object of this invention to provide the combination described above wherein the auxiliary door is in the form of an insertable assembly that is retrofitable to existing covers.

It is further an object of this invention to provide the combination described above wherein the auxiliary door has associated therewith a means for counting the fish as they are passed through the auxiliary door.

Other objects will become apparent from the following specifications, drawings, and the appended claims.

PRIOR ART

The prior art is replete with receptacles having hinged covers with auxiliary doors therein.

U.S. Pat. No. 4,456,141 to Pamment teaches a receptacle having a hinged cover and an auxiliary door resiliently biased in the open position.

U.S. Pat. No. 1,691,160 to Meuttman teaches a receptacle having a cover and multiple auxiliary doors biased in the closed position.

U.S. Pat. No. 2,511,648 to Milholland, teaches an insulated receptacle having a hinged cover and an auxiliary door in the cover.

However, the novel cover elements of this invention, in combination, are not found in the prior art.

BRIEF DESCRIPTION OF THE INVENTION

The invention is characterized as being a hinged top cover for a fish receiving receptacle, and the cover defines a passage therethrough into which is secured a frame containing a resiliently biased auxiliary door. The door is held in the closed position against the bias of a spring by means of a movable stop. Disengagement of the stop from the door permits the bias of the spring to hold the door in the open outward position.

DETAILED DESCRIPTION OF THE INVENTION

Figure 1:
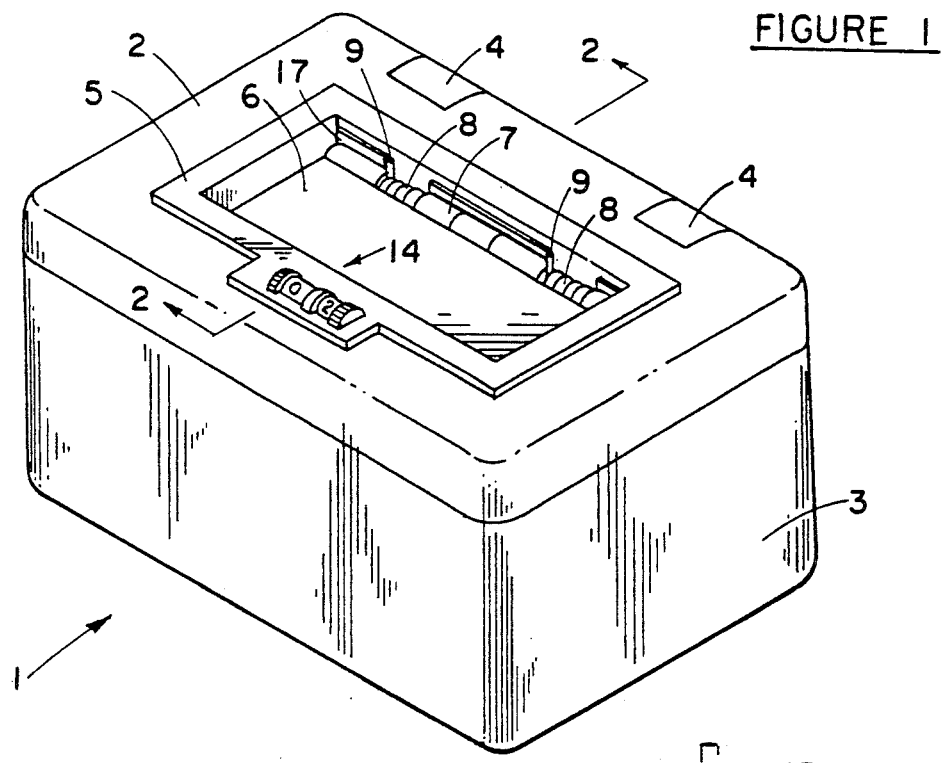
FIG. 1 is a pictorial view of the cover and auxiliary door article of this invention.

In the figures, like numbers refer to like objects.

Cooler 1 is of a conventional insulating design and is provided with cover 2 secured to receptacle 3 by means of hinges 4. Cover 2 defines a passage therethrough into which frame 5 may be inserted. Auxiliary door 6 is joined to frame 5 by means of hinge 7 as shown. Hinge 7 has as a part thereof springs 8 having arms 9 and 10 which bias the two sides of hinge 7 towards each other. Auxiliary door 6 is sized to fit inside the inside dimensions of frame 5. Movable stop 12 holds door 6 in the closed position against the biasing force of springs 8.

Auxiliary door 6 is provided with a resilient biasing means. In the embodiment shown in FIGS. 1 through 3, hinge 7 is provided with springs 8 having arms 9 secured to first hinge side 17 and arms 10 secured to second hinge side 18 as shown. The means of securing arms 9 and 10 to sides 17 and 18 may be by welding, soldering, adhesive bonding the like. Spring 8 is loaded at assembly with hinge 7 so that first hinge side 17 and second hinge side 18 are resiliently biased towards each other for all positions that door 6 will take in use in this invention.

It should be understood that cooler 1 with auxiliary door 6 can be used for purposes other than placing fish in cooler 1. However, the novel utility of this invention resides largely in the convenience that it provides to placing fish on ice in cooler 1 by passing them through auxiliary door 6.

Frame 5 is fitted in the opening in cover 2 and retained there by friction. Alternative means of securing frame 5 in cover 2 would include adhesive fastening as well as mechanical fasteners and the like.

In use, once a fish is unhooked from the line, the hand holding the fish presses door 6 into the open inward position 16 and the fish is dropped into the cooler.

Figure 2:
FIG. 2 is a fragmentary elevational section to the auxiliary door in the cover of FIG. 1 taken along section line 2—2 of FIG. 1.

If unrestricted, the bias in spring 8 will urge door 6 into the open outward position 15, shown dashed in FIG. 2. The bias in spring 8 acting through hinge 7 will retain auxiliary door 6 against frame 5 as shown dashed in FIG. 2. In normal use, stop 12 retains auxiliary door 6 in the closed position shown in solid lines in FIG. 2. Pressure on door 6 can move auxiliary door 6 to the open inward position 16 shown dashed in FIG. 2.

In situations where it is desirable to do so, movable stop 12 can be moved away from contact with door 6 which permits the biasing forces of springs 8 to put door 6 in the open outward position 15. This position is useful when placing a large number of fish in the cooler over a brief period and to add ice to the cooler. To return the door to the normal operating mode, the door is pressed through frame 5 past stop 12 and into the open inward position 16. Auxiliary door 6 is thereby returned to its normal operating position relative to stop 12.

It has been found that the utility of the cover with auxiliary door combination is enhanced by providing a counter 14 incorporated in frame 5. The counter serves to keep track of the number of fish placed in the cooler and helps the angler avoid exceeding the bag limits. Counter 14 is here shown as a manual drum style counter. Any suitable counter mechanism will serve the same utility.

As disclosed herein, frame 5 is retrofitable into a suitable opening formed in a door 2 of an existing cooler.

Figure 3:
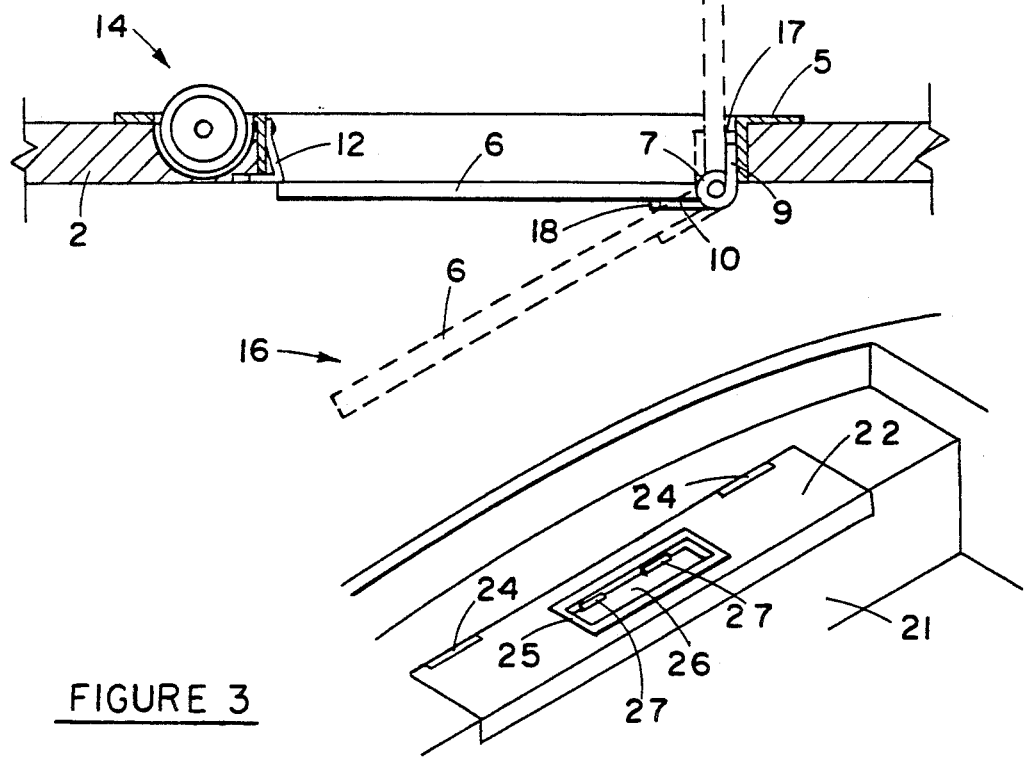
FIG. 3 is a fragmentary pictorial view of a live well embodiment of the cover and auxiliary door of this invention.

Referring now to FIG. 3 wherein the cover and auxiliary door combination of this invention is shown in combination with a live well 21. Cover 22 is provided with hinges 24 and cover 22 defines an opening into which frame 25 is engaged. Auxiliary door 26 is hingeably mounted in frame 25 by means of resiliently biased hinges 27 in much the same way as auxiliary door 6 is mounted in frame 5 as shown in FIGS. 1 and 2. Auxiliary door 26 provides a means by which fish may be conveniently placed in live well 21.

The above disclosures would enable one skilled in the art to make and use the invention for its intended purposes. However, it should be understood that the invention should not be limited to the embodiment disclosed but should be only limited by the appended claims and all equivalents thereto that would become apparent to one skilled in the art.

I claim:

1. In combination, an insulated fish receiving receptacle, having a hinged cover, and an auxiliary door secured in said cover, and comprising;
  A) A cover, hingeably secured to an insulated fish receiving receptacle so as to sealably close the receptacle,
  B) an opening defined by the cover and the opening passes through said cover and the opening is configured so as to receive an auxiliary door assembly,
  C) an auxiliary door assembly, secureable in said opening in said cover, said door assembly having;
    1) a frame defining a door opening,
    2) a door hingeably mounted in said frame so as to form an openable closure for said door opening, such that the door is positionable in an open outward position wherein the door is positioned at a location outside the receptacle, an open inward position wherein the door is positioned at a location inside the receptacle and a closed position wherein the door closes the door opening,
    3) a resilient door biasing means which serves to provide a bias to the door, said bias serves to urge the door in the open outward direction, and
    4) a movable stop projecting into the frame and serving to hold the door in the closed position against the bias, and the movable stop is positionable so as to permit the door to pass through the frame into the open outward position.

2. The combination of claim 1 wherein the auxiliary door assembly is provided with a counting device.

3. The combination of claim 1 wherein the fish receiving receptacle is a portable insulating cooler.

4. The combination of claim 1 wherein the fish receiving receptacle is a live well.

* * * * *